(12) United States Patent
Susekov et al.

(10) Patent No.: US 9,346,030 B2
(45) Date of Patent: May 24, 2016

(54) DEVICE FOR PRODUCTION OF SOOT FROM RUBBER WASTE

(71) Applicants: Zakrytoe Aktsionernoe Obschestvo "Nauchno-Proizvodstvennoe Ob'edinenie Innovatekh", St. Petersburg (RU); Evgeny S. Susekov, St. Petersburg (RU); Alexei S. Gradov, St. Petersburg (RU)

(72) Inventors: Evgeny S. Susekov, St. Petersburg (RU); Alexei S. Gradov, St. Petersburg (RU)

(73) Assignees: Zakrytoe Aktsionernoe Obschestvo "Nauchno-Proizvodstvennoe Ob'edinenie Innovatekh", St. Petersburg (RU); Evgeny S. Susekov, St. Petersburg (RU); Alexei S. Gradov, St. Petersburg (RU)

( * ) Notice: Subject to any disclaimer, the term of this patent is extended or adjusted under 35 U.S.C. 154(b) by 0 days.

(21) Appl. No.: 14/302,928

(22) Filed: Jun. 12, 2014

(65) Prior Publication Data

US 2014/0294686 A1 Oct. 2, 2014

Related U.S. Application Data

(63) Continuation of application No. PCT/RU2012/000959, filed on Nov. 20, 2012.

(30) Foreign Application Priority Data

Dec. 13, 2011 (RU) .................................. 2011150815

(51) Int. Cl.
*B01J 6/00* (2006.01)
*C10G 1/10* (2006.01)
(Continued)

(52) U.S. Cl.
CPC *B01J 6/008* (2013.01); *C08J 11/12* (2013.01); *C10B 47/46* (2013.01); *C10B 53/07* (2013.01); *C10G 1/10* (2013.01); *C10K 1/04* (2013.01); *Y02P 20/143* (2015.11)

(58) Field of Classification Search
CPC .............. B01J 6/00; B01J 6/008; C08J 11/04; C08J 11/10; C08J 11/12; C10B 53/07; C10G 1/00; C10G 1/002; C10G 1/10
See application file for complete search history.

(56) References Cited

U.S. PATENT DOCUMENTS 5,728,361 A * 3/1998 Holley ........................ 423/449.6
5,783,046 A * 7/1998 Flanigan ........................ 201/25
(Continued)

FOREIGN PATENT DOCUMENTS

RU 2153415 C2 7/2000
RU 2211144 C2 8/2003
(Continued)

OTHER PUBLICATIONS

International Search Report from International Application No. PCT/RU2012/000959, filed Nov. 20, 2012, mailed May 16, 2013.
(Continued)

*Primary Examiner* — Natasha Young
(74) *Attorney, Agent, or Firm* — Patentbar International, P.C.

(57) ABSTRACT

The device for producing carbon black from waste rubber has a pyrolysis reactor, a solid product discharge system, a pyrolysis gas emission means, a shell and tube heat exchanger, a solid pyrolysis product receiver, a pyrolysis gas condenser, and a flue gas output means. The shell and tube heat exchanger has a burner linked to the tubes. The space between the tubes of the heat exchanger is filled with a disperse material having a particle size of 3-10 cm. The inlet of the pyrolysis gas emission means is linked to the pyrolysis reactor, and the outlet is linked to the space between the tubes of the heat exchanger. The inlet of the condenser is linked to the casing of the pyrolysis reactor, which is linked to the tubes of the heat exchanger.

6 Claims, 1 Drawing Sheet

(51) Int. Cl.
  *C10B 53/07* (2006.01)
  *C08J 11/12* (2006.01)
  *C10B 47/46* (2006.01)
  *C10K 1/04* (2006.01)
  *C10G 1/00* (2006.01)

(56) References Cited

U.S. PATENT DOCUMENTS 7,416,641 B2 * 8/2008 Denison .................. 202/99
2010/0133085 A1 6/2010 Hutchins

FOREIGN PATENT DOCUMENTS

RU 2212430 C1 9/2003
RU 2269415 C2 2/2006
RU 2408819 C1 1/2011

OTHER PUBLICATIONS

Reinforcement of Elastomers, edited by G. Kraus, M.: Khimiya, 1968, pp. 238-240.
Islamov, M. Sh., Furnaces in the Chemical Industry, M.: Khimiya, 1975, pp. 124-125.
Chemical Encyclopedia: In 5 vol.—M.: Sovetskaya entsiklopediya, 1993, v.4. p. 1114.
Chemical Encyclopedia: In 5 vol.—M.: Sovetskaya entsiklopediya, 1990, v. 2, p. 1026.
Chemical Encyclopedia: In 5 vol.—M.: Sovetskaya entsiklopediya, 1990, v. 2, p. 254.
Karamzin, V. V., et al, Magnetic and electric methods of enrichment, M.: Nedra,1988, pp. 109-115.

* cited by examiner

DEVICE FOR PRODUCTION OF SOOT FROM RUBBER WASTE

RELATED APPLICATIONS

This Application is a Continuation application of International Application PCT/RU2012/000959, filed on Nov. 20, 2012, which in turn claims priority to Russian Patent Applications No. RU 2011150815, filed Dec. 13, 2011, both of which are incorporated herein by reference in their entirety.

FIELD OF THE INVENTION

The invention relates to waste recycling technologies and may be used in the rubber component and chemical industry to produce soot from waste.

BACKGROUND OF THE INVENTION

There is a known soot production device comprising a cylindrical reactor with a refrigerator, electric filter, microgrinder, cyclone, bin, soot granulator and drier series-connected to it (see Reinforcement of Elastomers, edited by G. Kraus, transl. from English. M.: Khimiya, 1968, pp. 238-240).

The disadvantages of the device are high energy costs of the soot production process due to dissipation of the soot-and-gas flow heat into the atmosphere, and significant emissions of toxic gaseous products into the environment.

There is a known device for soot production from liquid waste comprising a cylindrical horizontal furnace, with a nozzle in its front part, where the combustion chamber has channels at two points at a tangent to the cylinder's surface generator, in which channels burners are fitted to prepare a gas-air mixture, with burning in the combustion chamber (see Islamov, M. Sh. Furnaces in the Chemical Industry. M.: Khimiya, 1975, pp. 124-125).

The disadvantages of the device are high energy costs of soot production due to the lack of an efficient system of recirculation (return to the process) of thermal energy, and atmosphere pollution.

There is a known method of processing of solid hydrocarbon raw materials and a plant for processing of solid hydrocarbon raw materials, which comprises a gastight pyrolysis chamber with channels of gas offtake and supply and a channel for gas emission into the atmosphere, gas heater comprising series-connected ventilator, heat generator and heat exchanger, gas cooler comprising a heat exchanger with a ventilator connected to the hydrocarbon raw material initial heating chamber, separator with a tank for pyrolysis liquid collection, and compressor. All the components of the plant with adjustable valves form a system of closed circuits. The circuit of gas preheating in the chamber comprises a channel for gas extraction from the chamber connected via a valve to the compressor inlet, a heat exchanger whose inlet is connected to the compressor's outlet via a valve, and the heat exchanger outlet connected to the channel for gas feeding to the chamber. The pyrolysis process circuit comprises a channel for gas offtake from the chamber, connected via a valve with the heat exchanger inlet, separator with a tank, its outlet connected via a valve to the compressor's input; and a heat exchanger whose inlet is connected to the compressor's inlet via a valve, and whose outlet is connected to the channel for gas feeding to the chamber (see RF Patent No. 2212430 publ. 20 Sep. 2003).

The disadvantages of the device are high energy costs, heavy pollution via the gas emission duct, and low quality of produced soot containing up to 12-15% wt of ashes.

There is a known method of processing of worn tires and rubber components and a device for its embodiment (see RF Patent No. 2211144 publ. 27 Aug. 2003). In the device, a cylindrical extractor is arranged horizontally and has in its butt end a charging hatch with a cover and a rail track arranged along its inner generator line. On the rail track, a perforated drum provided with a raw material charging hatch and an assembly of drum rotation along its axis resting on supports arranged on a trolley, is driven into the extractor. The drum has a subassembly for engagement with a rotation drive arranged outside the extractor. The extractor has a gate charging device, vacuum extractor with a condenser and distillate tank, product lines for residue connection with gates and metal cord, extractor heating jacket with flue gas inlet and outlet pipes, and a bubbler device with an inlet manifold and a control valve.

The disadvantages of the device are high energy costs related to the necessity to use vacuum in the process, and low quality of the soot produced due to a high content of mineral impurities (ash).

The closest to the claimed invention is the method of thermal processing of worn tires and a plant for its embodiment (see RF Patent No. 2269415 publ. 31 Oct. 2006) that we adopted as the prototype.

The plant comprises a reactor, a system of extraction of gases generated in the reactor, a reduction gas generator connected to the reactor, a system of shredded tire feeding into the reactor, a receiver for pyrolysis solid residue, and a thermal unit with a fume gas extractor. The reactor gas extraction system is connected to the reduction gas generator and thermal unit, the fume gas extractor being connected to the reduction gas generator and reactor. The plant additionally comprises a liquid fuel fraction separation system installed to enable connection of reactor-generated gases to the system, and contains also a shredded tire preheating system connected to the flue gas extractor.

A disadvantage of the device is a high energy cost due to the high (800° C.) temperature of pyrolysis (the soot produced at lower temperatures has low physico-chemical performances and is not suitable for further use) and to significant amounts of heat emitted to the atmosphere with flue gases. Among the disadvantages are also high emission of pollutants generated at the high temperature of pyrolysis and during the production of reduction gases (CO and aromatic hydrocarbons), and the lack of an efficient system of toxic gas detoxification (such as gas afterburning system).

Material disadvantages are a low quality of the soot produced due to the high ash content and a low soot output (about 28-35%) caused by carbon consumption for generation of reduction gases (CO).

SUMMARY OF THE INVENTION

The purpose of the claimed invention is a reduction of energy costs of soot production from rubber waste, and reduction of environment pollution and higher quality of the processing product (soot).

The object is achieved by the thermal unit is designed as a shell-and-tube heat exchanger with a burner connected to the tubes, enabling prevention of direct supply of flue gases and reduction gas to the reactor and dilution of pyrolysis gases with non-condensable gases, lower concentration of pyrolysis gases—products of waste decomposition in the gas flow extracted from the reactor for subsequent processing—separation of a liquid fraction and burning; lower rate of pyrolysis product condensation and extraction of the flue and reduction gas heat by pumping an additional amount of heat transfer agent compared to the undiluted pyrolysis gases condensation; supply of heating gases—fuel combustion products from the heat exchanger into its tubes virtually without heat losses, and the shell side of the heat exchanger is filled with disperse material whose particle size varies from 3 cm to 10 cm, while the use of a disperse bed with the particle diameter exceeding 10 cm would lead to an abrupt reduction of the specific heat exchange surface between the bed pyrolysis gases pumped through it, which sharply decreases the heat transferred by the gases and leads to a drastic increase of time needed to heat the gas to the preset temperature, severe drop in the performances of the soot production process, and increasing heat losses; the solid product receiver comprises a shredder, magnetic separator, microgrinder, disengager, and cyclone reactor with a vortex burner and a nozzle axially installed on the burner, all series-connected to the solid product discharging system, to enable preparation of solid products for extraction of soot from them and production of high-quality soot at lower energy costs, grinding of the solid residue, separation of metal cord from the residue, separation of from the solid products of large pieces of cord, i.e. metal wire and some small metal particles, splitting the aggregations of small particles of ashes, metal, and carbon by grinding the solid products after the magnetic separator to a size of 0.15-0.1 mm and aerodynamic separation of particles by density using the disengager; separation of carbon particles from ash and metal particles, prevention of heavy abrasive wear of the vortex burner, reduction of ash content in the solid residue, reduction of energy costs of the process of soot production from waste, removal of liquid fraction and volatile products from carbon particles, dividing the ground solid material into soot and ashes, and additional soot production from volatile products; the pyrolysis gas extractor has its inlet connected to the pyrolysis reactor, while its outlet is connected to the shell side of the heat exchanger, enabling extraction of pyrolysis gases from the reactor to the heat exchanger and their thermal treatment, i.e. decomposition of resins and asphaltenes with generation of hydrocarbons suitable for soot production; the condenser is connected with its inlet to the pyrolysis reactor jacket connected to the heat exchanger tubes, and enabling supply to the condenser of already cooled pyrolysis gases coming out of the heat exchanger at a high temperature, extraction of hot gases from the heat exchanger to the jacket and use of their heat for heating the waste in the reactor; series-connected to the cyclone reactor are the cyclone, disengager and electrostatic separator; series-connected to the cyclone gas outlet are the fabric filter and electrostatic separator, and the gas outlet of the fabric filter is connected to the heat exchanger burner, enabling splitting the gases, soot and ashes flow coming out of the cyclone reactor into components, combustion of gas containing flammable components, and the use of its heat for heating the pyrolysis gases, which confirms the compliance of the claimed invention with the "novelty" criterion.

It is essential that the condenser's inlet is connected to the pyrolysis reactor jacket connected to the heat exchanger tubes. It is important that the cyclone, disengager and electrostatic separator are series-connected to the cyclone reactor, and the fabric filter and electrostatic separator are series-connected to the cyclone's gas outlet, and the gas outlet of the fabric filter is connected to the heat exchanger's burner.

It is also essential that the flue gas extractor is connected to the pyrolysis reactor jacket and to the heat exchanger tubes, and the particle size of disperse material varies within 3-10 cm. The thermal unit provided in the device as a shell-and-tube heat exchanger with a burner connected to the tubes enables prevention of direct supply of the heat of flue gases and reduction gas to the reactor.

Feeding these gases to the reactor results in dilution of pyrolysis gases with non-condensable gases, which reduces the concentration of pyrolysis gases (waste decomposition products) in the gas flow extracted from the reactor for further processing (liquid fraction release and combustion) and results in the need to increase the thermal power of the condensation system, since in this system, flue gases and reduction gases (non-condensable) not only reduce the pyrolysis product condensation rate, but also bring about the need to extract the heat of flue gases and reduction gases by pumping an additional amount of heat transfer agent compared to the condensation of undiluted pyrolysis gases, resulting in higher energy cost of the soot production process, since some of the heat (heat of flue gases and reduction gases) is emitted to the atmosphere.

The use of a heat exchanger with a burner enables thermal processing of pyrolysis gases resulting in thermal destruction of high molecular weight compounds (mainly resins and asphaltenes whose molecular weight varies between 500 and 1500), which eventually reduces the boiling interval of oil produced from gaseous products and reduction of its coking, i.e. oil performances are provided meeting the requirements set for high-quality liquid raw material for soot production.

For higher efficiency of heat transfer in the heat exchanger, the shell side is filled with a disperse bed. Pyrolysis gases are pumped through the heated disperse bed with a developed large specific surface, and are heated during the heat exchange with the bed. The large specific surface of the bed ensures a high pyrolysis gases heating rate; the heated disperse bed also serves as heat accumulator; as a result, the pyrolysis gases' heating temperature is maintained at a constant level, i.e. at gas flow rate variations, its heating temperature remains constant, which is important for the pyrolysis process, since at heat transfer agent temperature variations (pyrolysis gases act as a heat transfer agent) temperature variations in the reactor will be observed, which leads to changes in the pyrolysis gases composition, i.e. violations of the process mode.

The use of a disperse bed with a particle diameter of less than 3 cm increases the specific surface, but simultaneously the hydrodynamic resistance grows significantly, since for pyrolysis gas pumping through the bed with a particle diameter of less than 3 cm the power of the pumping system (ventilator, compressor) will have to be greatly increased, which will increase the energy costs of the soot production process.

The use of a disperse bed with a particle diameter of over 10 cm will greatly decrease the specific heat exchange surface between the bed and the pyrolysis gases pumped through it, which severely decreases the amount of heat conveyed to the gases and severely increases the time needed to heat the gas to the preset temperature, i.e. in this case the performance of the soot production process drops severely and more thermal energy is lost due to heat losses, eventually increasing the energy consumption for the entire process of soot production from waste.

A burner added to the heat exchanger enables a reduction of energy costs by preventing unavoidable heat losses in the transfer of heating gases from the combustion system to the heat exchanger. In our case, the heating gases (fuel combustion products) are generated directly in the heat exchanger and fed to its tubes virtually without heat losses, i.e. virtually all heat obtained in the fuel combustion is spent to heat the heat exchanger (disperse bed and heat exchanger structural components).

The use of a solid pyrolysis product receiver comprising shredder, magnetic separator, microgrinder, disengager, and cyclone reactor with a vortex burner and a nozzle axially installed on the burner, all series-connected to the solid products discharge system, ensures preparation of solid products for soot extraction from them and enables production of high-quality soot while reducing the energy costs (as compared to the family patents and the prototype).

It is known that solid pyrolysis products contain a significant (10-15%) quantity of ashes and some quantity (5-15%) of volatile products (hydrocarbons remaining in solid products after the waste pyrolysis). Solid products with such performances are unfit for use as soot, therefore they have to be additionally processed, which presents significant technical difficulties, primarily because the ash particles in solid products are bound (joined) with soot particles, and an additional operation (extended mechanical grinding with high energy costs) for separation (disengagement) of ash and soot particles, so as to separate high-quality soot that was used in the rubber manufacturing from ash particles in a subsequent phase (separation).

A shredder added to the receiver enables crushing the solid reside and separating the metal cord from the residue, and the series connection of the magnetic separator ensures separation of large pieces of cord (metal wire) and some of the small metal particles from solid products.

To separate aggregations of small ash and metal particles and carbon particles (containing soot and small ash particles), the device uses a microgrinder, which enables crushing of the solid products after the magnetic separator to a size of 0.15-0.1 mm; as a result, in the next phase of solid product processing, it becomes possible to separate the particles by density aerodynamically, using a disengager unit. Since the density of mineral particles (ash) and metal inclusions is much higher than the carbon particles' density, the disengager will separate carbon particles from ash and metal particles.

The soot density is 1.76 g/cm$^3$ (Chemical Encyclopedia: In 5 vol.—M.: Sovetskaya entsiklopediya, 1993, v. 4, p. 1114). The density of ash particles mainly consisting of silicon dioxide and iron oxides is much higher. The density of silicon dioxide is 2.6 g/cm$^3$ (see Chemical Encyclopedia: In 5 vol.—M.: Sovetskaya entsiklopediya, 1990, v. 2, p. 1026). The density of $Fe_2O_3$ is 5.24 g/cm$^3$ (see Chemical Encyclopedia: In 5 vol.—M.: Sovetskaya entsiklopediya, 1990, v. 2, p. 254).

This is necessary to prevent heavy abrasive wear of the vortex burner (ash and metal particles have highly abrasive properties unlike particles of carbon, which is often used in high-temperature bearings, electric brushes etc.) for subsequent feeding of ground solid residue to the cyclone reactor. This is also needed to reduce, already in this phase, the ash content in the solid residue and avoid supplying excessive material to the cyclone reactor, the heating of which requires energy consumption. Thus, the microgrinder and disengager enable a reduction of energy costs of the process of soot production from waste.

The use of a cyclone reactor with a vortex burner having a nozzle installed along its axis enables to remove volatile products from carbon particles and to separate soot particles and particles of mineral impurities (ashes) aggregated with them that were added to the rubber mixture (silicon oxide, titanium oxide, iron oxides, zinc oxide etc.) This enables dividing the ground solid material into soot and ash at subsequent stages using a cyclone, electric separator, and fabric filter.

The vortex burner enables feeding carbon particles into the cyclone reactor in the form of vortex, which ensures intense and uniform mixing with an atomizing nozzle of a liquid hydrocarbon fraction (obtained from pyrolysis gases in the condenser) and carbon particles. As a result, liquid fraction is sedimented on the carbon particles, and covers the carbon particles with a liquid film. The mixture formed in the vortex generated by the vortex burner gets into a vortex of combustion products at a high temperature formed as a result of flammable gas combustion in the cyclone reactor burners. At the high temperature, some of the liquid fraction is burnt out and carbon particles are heated in the vortex. The liquid fraction is first evaporated and then burnt. This produces an effect of protection against carbon particle burning.

As a result of carbon particles' heating, the liquid fraction is removed from them (soaked up by the particles), as well as the volatile products (remaining in the particles in the rubber pyrolysis). The liquid fraction vapors coming out of ground carbon are partially burnt and partially thermally decomposed producing soot and flammable gases.

Thus, the use of a cyclone reactor with a vortex burner and nozzle ensures splitting of aggregations of soot and ash particles, and also results in additional soot production from volatile products, thus increasing the output and improving the quality of soot.

Connecting the pyrolysis gas extractor with its inlet to the pyrolysis reactor and with its outlet to the heat exchanger's shell side enables withdrawal of pyrolysis gases from the reactor to the heat exchanger for their thermal processing in order to decompose resins and asphaltenes, thus producing hydrocarbons suitable for soot production.

Due to the condenser connected with its inlet to the pyrolysis reactor jacket connected to heat exchanger tubes, the already cooled pyrolysis gases are fed into the condenser leaving the heat exchanger at a high temperature. The connection of the pyrolysis reactor jacket to the heat exchanger tubes enables extraction of hot gases from the heat exchanger to the jacket and to use their heat for heating the waste in the reactor, which reduces the energy costs of the soot production process, reducing the consumption of heat transfer agent for condenser cooling.

The flow of gases, soot, and ashes coming out of the cyclone reactor has to be split into components. For this purpose, the cyclone, disengager and electrostatic separator are connected in series to the cyclone reactor. In the cyclone, particles are separated from the flow, and gas is fed to a fabric filter. The particles released in the cyclone (soot, ashes, burnt-out furnace lining, and metal oxides) have to be separated to obtain high-grade soot. Therefore, the disengager is used in the first phase to release particles of a size of up to 0.1 mm. However, it is impracticable to separate particles of a size of about 0.05-0.07 mm with the use of a disengager. For this purpose, the electrostatic separator is connected to the disengager, which separates the particles subject to their conductivity and enables separation of particles of a size of 0.05-0.07 mm. Soot particles have a high conductivity, and ash particles (oxides and minerals) have a low conductivity, therefore they can be separated with the electrostatic separator.

For instance, electrostatic separators may be used for separation of particles with different conductivity (see Karmazin, V. V., Karmazin, V. I. Magnetic and electric methods of enrichment.—M.: Nedra, 1988, pp. 109-115).

The gases leaving the cyclone contain fine particles, therefore to separate them from the gas flow, a fabric filter is connected to the cyclone, where both soot particles and ash particles are sedimented. To separate soot particles from ash particles, the fabric filter outlet is connected to the electrostatic separator. The gas cleaned free of solid particles in the fabric filter contains flammable components, therefore to prevent pollution of the atmosphere (the gas contains CO, hydrogen, hydrogen sulfide etc.), and to use the gas energy, the gas outlet of the fabric filter is connected to the heat exchanger burner, which enables heating the gas using its heat in the process of pyrolysis gas heating, thus reducing the atmosphere pollution and energy costs.

For those skilled in the art, the claimed invention does not clearly follow the prior art, which confirms its compliance with the "inventive level" criterion.

Figure 1:
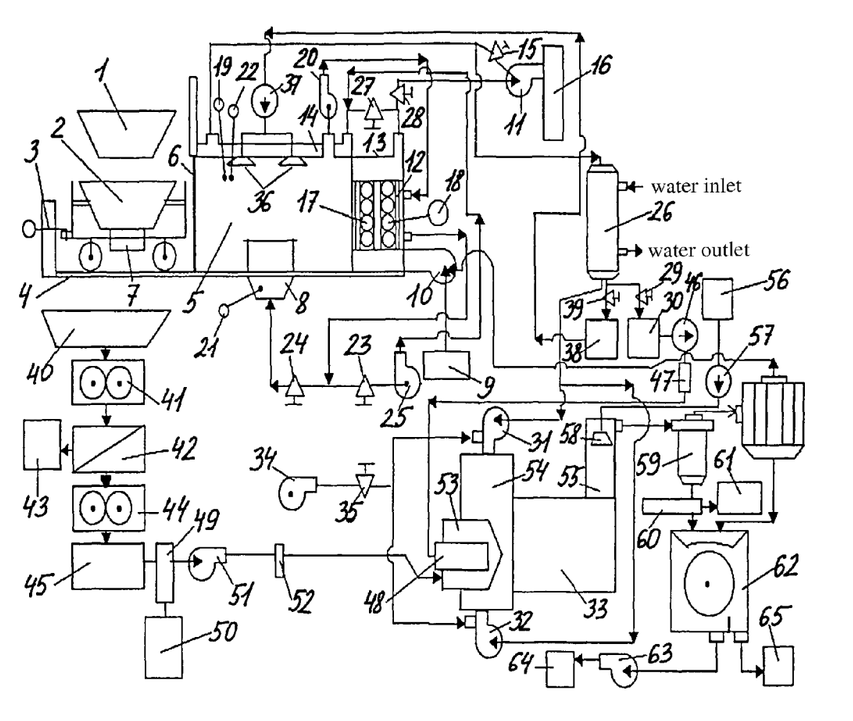
FIG. 1 shows the general appearance of the plant for soot production from rubber waste.

The device comprises bin 1 with waste, container 2 connected to device 3 and mounted on rails 4, reactor 5 with gate 6, branches 7 and 8, fuel tank 9, burner 10 connected to tank 9, smoke extractor 11 connected to tubes 12 of heat exchanger 13, jacket 14 of reactor 5, valve 15 and flue gas duct 16, disperse bed 17 arranged in the shell side on heat exchanger 13, temperature sensors 18 and 19, pyrolysis gas extractor 20, temperature sensor 21 installed in branch 8, pressure sensor 22, valves 23 and 24 connected to gas blower 25, condenser 26, valves 27, 28 and 29, liquid fraction tank 30, burners 31 and 32 installed in cyclone reactor 33, ventilator 34 with valve 35, nozzles 36 connected to pump 37, tank 38 for water with tap 39 connected to condenser 26, solid product discharge system 40 with shredder 41 connected to it, magnetic separator 42 connected to shredder 41 and tank 43, microgrinder 44 connected to magnetic separator 42 and bin 45, pump 46 with flow controller 47 connected to nozzle 48, disengager 49 connected to receiver 50 and ventilator 51, weight feeder 52 connected to ventilator 51 and vortex burner 53, combustion chamber 54 of cyclone reactor 33, refrigerator 55 connected to furnace 33, water tank 56 connected to pump 57, nozzle 58, cyclone 59 connected to disengager 60 with receiver 61, electrostatic separator 62 connected to disengager 60, ventilator 63 connected to separator 62 and receiver 64, tank 65 connected to separator 62, and fabric filter 66 connected to separator 62 and burner 10.

According to the invention, the device operates as follows.

Shredded worn tires are fed from bin 1 to container 2. When filled, container 2 is moved with device 3 to pyrolysis reactor 5 on rails 4, and gate 6 is closed. Branch 7 for gas supply to container 2 is connected to branch 8 installed between the rails in reactor 5. Fuel is fed from fuel tank 9 to burner 10 and burnt, and the combustion products are pumped through tubes 12 of shell-and-tube heat exchanger 13 with smoke exhauster 11; next, the combustion products are pumped through jacket 14 of reactor 5 and via valve 15 removed to flue gas duct 16. Passing via the tubes of heat exchanger 13, the combustion products heat the tubes in the heat exchanger. Heat from heat exchanger tubes is conveyed to disperse bed 17, which is heated to a temperature of over 1100° C. The disperse bed heating temperature is monitored by readings of temperature sensor 18. Passing via jacket 14 of reactor 5, the combustion products heat the reactor walls. Heat from the walls of reactor 5 is conveyed by emission and convection to the walls of container 2; next, heat is transferred from the walls by thermal conduction to the shredded rubber waste, heating it. The rubber waste heating temperature is monitored by readings of temperature sensor 19. Initially after container 2 enters reactor 5, the gaseous medium contains mainly air. With the aid of pyrolysis gas extractor (ventilator) 20, gaseous medium is pumped through the waste layer in container 2 and via disperse bed 17 to heat exchanger 13. Being filtered through disperse bed 17, the gaseous medium is heated, which is monitored by readings of temperature sensor 21, and next, via branch 8 of reactor 5 and branch 7 of container 2, returns to the layer of shredded waste and heats the waste flowing through layer. Thus, the thermal energy required for waste thermal decomposition is supplied through the walls of container 2 and is directly fed to the waste layer with the heated gaseous medium.

When rubber waste is heated to a certain temperature (depending on the type of waste), for instance up to 300° C. in our case, the rubber thermal decomposition process begins with generation of pyrolysis gases and solid products. The pyrolysis gases enter the gaseous medium and in a mixture with the medium, circulate along the circuit "reactor 5—heat exchanger 13." As a result of release of pyrolysis gases, the pressure in reactor 5 rises, which is monitored by readings of pressure sensor 22. To prevent a significant pressure rise and collapse of reactor 5, some of the pyrolysis gases heated to a temperature of over 1100° C. are extracted from heat exchanger 13 with the aid of valves 23, 24 and compressor 25 and via jacket 14 of reactor 5 are fed to condenser 26. Simultaneous with the feeding of pyrolysis gases to jacket 14, the feeding of combustion products to jacket 14 is stopped. For this, valve 27 is shut off and valve 28 is opened. Passing via jacket 14 of reactor 5, the pyrolysis gases convey heat to reactor walls, which is next conveyed to the rubber waste in the reactor. The enables to effectively use the pyrolysis gases' thermal energy and reduce the energy consumption of the soot production process. The pyrolysis gases cooled down to a temperature are next cooled in condenser 26 by heat exchange with cooling water pumped through the condenser jacket. As a result of cooling, a liquid hydrocarbon fraction is separated from the pyrolysis gases by condensation, which via valve 29 is drained to tank 30, after which the pyrolysis gases are fed to burners 31 and 32 of cyclone reactor 33 and burned. For this, air supply to burners 31 and 32 with ventilator 34 and valve 35 to ensure complete combustion of gaseous products.

Some of the pyrolysis gases, via valve 24 from heat exchanger 13 are returned to reactor 5 and passed through the waste layer in container 2.

The pyrolysis gases are cooled, and the rubber waste is heated, thus providing supply of heat needed for the thermal decomposition process to the waste. The quantity of pyrolysis gases extracted from heat exchanger 13 to condenser 26 and returned to reactor 5 is adjusted with valves 23 and 24 so that the pressure in pyrolysis reactor 5 would not drop below the atmospheric one (in this case, intake of ambient air to the reactor and ignition is possible, which would stop the process), and would not exceed 2 atmospheres, since for higher pressures, a reactor with thicker walls has to be used, which would result in a higher metal consumption of the entire plant.

The completion of the rubber waste thermal decomposition process is monitored by the decrease of the gaseous product output (the pressure in the pyrolysis reactor begins to drop to the atmospheric value, and the quantity of pyrolysis gases extracted from heat exchanger 13 to condenser 26 is reduced to zero, which is also monitored by the quantity of liquid hydrocarbon fraction extracted from condenser 26 to tank 30, which virtually does not flow out of the condenser upon completion of the pyrolysis process).

Upon completion of the rubber waste thermal decomposition process, the fuel burning in burner 10 is stopped. Water from tank 38 is atomized into pyrolysis reactor 5 via nozzles 36 with pump 37, thus cooling container 2 with solid products to a temperature below 100° C., which is monitored by readings of temperature sensor 19. The steam resulting from evaporation of water atomized in reactor 5 is extracted to condenser 26 and condensed, and the obtained condensate is drained to tank 38 via valve 39. This water is then reused for atomizing into reactor 5 in a next waste thermal decomposition cycle in order to reduce the water consumption in the process and to prevent discharge of dirty water to the environment.

After cooling, the container with solid products of waste pyrolysis is removed from pyrolysis reactor 5. For this, gate 6 is opened, and container 2 is taken out of reactor 5 with device 3 on rails 4. The container is dumped, and solid products are emptied under their own weight from container 2 to the discharge system 40 (bin with a screw). From discharge system 40, solid products are fed to roller shredder 41 and shredded. After this, the solid products are fed to magnetic separator 42, with the aid of which metal is extracted from solid products and fed to tank 43, and the solid products themselves are fed from the magnetic separator to microgrinder 44 where the products are ground to a particle size of 0.1-1.0 mm, after which the ground products are fed to receiver 45.

Shredded worn tires are fed from bin 1 to container 2. When filled, container 2 is moved to reactor 5 on rails 4 with the aid of device 3, and gate 6 is closed. The waste decomposition process is repeated.

From liquid hydrocarbon fraction tank 30, liquid fraction is fed to nozzle 48 with pump 46 at a preset flow rate (monitored by readings of flowmeter 47) and atomized Simultaneously, solid products are fed from receiver 45 to disengager 49 and a part of ashes is separated to be fed to receiver 50, and the solid products are fed at the rate of 170 kg/h with the aid of blower 51 via weight feeder 52 with a preset mass flow and vortex burner 53 to combustion chamber 54 of cyclone reactor 33. The generated vortex of ground solid products is mixed with the jet of atomized liquid hydrocarbon fraction; as a result, the liquid fraction is sedimented on the solid particles. Some of this fraction is soaked up by the particles' pores (the particles of solid products have a porous structure formed after the volatile products' release in the waste pyrolysis), and the rest forms a liquid film on the solid particles' surface. This mixture enters the combustion products jet formed as a result of gas combustion in burners 31 and 32, and is heated. The liquid film evaporates, and the produced gases begin to burn. The particles' temperature rises to 1000° C. and higher; as a result, the soaked liquid fraction is removed from the particles as vapors, and residual volatile products are released. Besides, as a result of occurring thermal stresses, in aggregations of soot and ash particles (soot and ash particles have different thermal expansion coefficients) the ash particles and soot particles are separated (cracked), i.e. the aggregations are destroyed.

The mixture of gases and solid particles (combustion products, soot, ashes) generated in the furnace travels in the cyclone reactor and enters refrigerator 55. In refrigerator 55, the mixture is cooled down by atomizing water, which is fed from tank 56 to nozzle 58 with pump 57. The mixture cooled to 500-700° C. is fed to cyclone 59 where solid particles (soot, ashes, products of reactor lining breakage etc.) are released from the mixture, which after cooling to 100-120° C. in the cyclone bin are fed to disengager 60. In disengager 60, larger particles (over 0.15 mm in size) are separated and fed to receiver 61, and the main flow of particles from the disengager is fed to electrostatic separator 62 where soot and ashes are separated. Soot is pneumatically fed from electrostatic separator 62 to receiver 64 using blower 63, and ashes are discharged into receiver 65. The gases from cyclone 59 are fed to fabric filter 66, where fine soot and ash particles are separated that were not sedimented from the gas flow in cyclone 59. These particles are fed to electrostatic separator 62 and divided into soot and ashes. The gases cleaned free of solid particles in the fabric filter contain flammable components, therefore these gases are fed to heat exchanger burner 10 for burning. This enables to prevent emission of pollutants (the gases contain CO, hydrogen, hydrogen sulfide and aromatic hydrocarbons) to the atmosphere and to effectively use these gases' energy, thus reducing the overall energy costs of the soot production process.

DETAILED DESCRIPTION OF THE PREFERRED EMBODIMENTS

The invention is illustrated in the following examples.

Example 1

Worn tires shredded to a lump size of 40 mm in the amount of 1000 kg are fed from bin 1 to container 2. When filled, container 2 is moved with device 3 to pyrolysis reactor 5 on rails 4, and gate 6 is closed. Branch 7 for gas supply to container 2 is connected to branch 8 installed between the rails in reactor 5. From fuel tank 9, fuel is fed to burner 10 at the rate of 50 kg/h and burnt, and the combustion products at the rate of 600 kg/h (the combustion of 1 kg of fuel produces 12 kg of combustion products) are pumped through tubes 12 of shell-and-tube heat exchanger 13 with smoke extractor 11; next, the combustion products are pumped through jacket 14 of reactor 5 and removed to flue gas duct 16 via valve 15. Passing via the tubes of heat exchanger 13, the combustion products heat the tubes comprised in the heat exchanger. Heat from the heat exchanger tubes is conveyed to disperse bed 17, where the particle diameter is 3 cm, and the bed itself is for example gravel. The disperse bed is heated to a temperature of over 1100° C. The disperse bed heating temperature is monitored by readings of temperature sensor 18. Passing via jacket 14 of reactor 5, the combustion products heat the reactor walls. Heat from the walls of reactor 5 is conveyed by emission and convection to the walls of container 2; next, heat is transferred from the walls by thermal conduction to the shredded rubber waste, heating it.

The heat amount required for thermal decomposition of 1000 kg of worn tires is calculated as follows:

$Q\text{tot}=Q\text{heat}+Q\text{dec}+Q\text{loss},$ $Q\text{tot}=1.2\{(Av \text{ waste } Mw(T2-T1)+qMw)\}.$ $Q\text{tot}=1.24\{(1.4 \text{ kJ/kg } ° \text{ C. } 1000 \text{ kg}(400° \text{ C.}-20° \text{ C.}).+ 600 \text{ kJ/kg } 1000 \text{ kg})\}=1,358,400 \text{ kJ},$ where Q tot=total heat quantity required for thermal decomposition of the waste; Qheat=heat of waste heating up to the temperature of 400° C.; Q dec=heat consumed for waste decomposition; Qloss=heat losses making 20% of the total heat; q=specific heat of decomposition making 600 kJ/kg for rubber waste; Mw=1000 kg=weight of the waste; T1=20° C. and T2=400° C.=initial and final waste temperature; Av waste=specific heat of the waste equal to 1.4 kJ/kg ° C.

The rubber waste heating temperature is monitored by readings of temperature sensor 19. Initially after container 2 enters reactor 5, the gaseous medium contains mainly air. With the aid of pyrolysis gas extractor (ventilator) 20, the gas is pumped through the waste layer in container 2 and through disperse medium 17 of heat exchanger 13. Filtered through disperse bed 17, the gaseous medium is heated, which is monitored by readings of temperature sensor 21, and then returns to the layer of shredded waste via branch 8 of reactor 5 and branch 7 of container 2, and flowing through the layer heats the waste. Thus, the thermal energy necessary for heating and thermal decomposition of the waste is supplied via the walls of container 2 and is fed directly into the waste layer with the aid of the heated gaseous medium.

The combustion of 50 kg/h of fuel in burner 10 releases an amount of heat equal to 50 kg/h. 40,000 kJ/kg=2,000,000 kJ/h. Assume the efficiency of heat exchanger 13 to be 45% in this case, i.e. the gaseous medium flowing through the disperse bed in the shell side of heat exchanger 13 conveys the following amount of heat: 2,000,000 kJ/h·0.45=900,000 kJ/h.

Some of this heat is spent for rubber waste heating both by direct heat transfer with the heated gaseous medium flowing through the waste layer in container 2 and by heat exchange from the heated walls of reactor 5. Assume that in our case 60% of the heat is spent for waste heating and thermal decomposition, i.e. 540,000 kJ/h. The rest of the heat is spent for heating the reactor's structural elements and heat losses.

In such case, the time required for full thermal decomposition of 1000 kg of waste will be t=(1358400 kJ)/(540 000 kJ/h)=2.5 h, since it is in this time that the quantity of energy needed for thermal decomposition of 1000 kg of waste will be supplied. During this time, the following quantity of fuel must be burnt in burner 10: 50 kg/h·2.5 h=125 kg.

When rubber waste is heated up to a certain temperature (depending on the type of waste), for instance to 300° C. in our case, the process of thermal decomposition of rubber will start, generating pyrolysis gases and solid products.

Assume that in our case the rubber waste thermal decomposition releases 50% wt of pyrolysis gases and generates 50% wt of solid products containing 10% wt of metal cord, 10% wt of ashes and 10% wt of volatiles. Thus, in our case, decomposition of 1000 kg of waste will yield 500 kg of pyrolysis gases and 500 kg of solid products containing 50 kg of metal cord, 50 kg of ashes, 50 kg of volatile hydrocarbons, and 350 kg of soot that was used in the manufacturing of rubber and is already contained in the solid products of waste pyrolysis. These data are average values obtained experimentally and confirmed by data available in literary references on rubber waste pyrolysis.

The pyrolysis gases enter the gaseous medium and in a mixture with the medium, circulate along the circuit "reactor 5—heat exchanger 13." As a result of release of pyrolysis gases, the pressure in reactor 5 rises, which is monitored by readings of pressure sensor 22. To prevent a significant pressure rise and collapse of reactor 5, a part of pyrolysis gases heated up to a temperature over 1100° C. (it is at such temperatures that pyrolysis gases contain negligible quantities of resins and asphaltenes deteriorating the quality performances of liquid raw material for soot production) is removed with valves 23, 24 and blower 25 from heat exchanger 13 at the average rate of 200 kg/h, and fed to condenser 26 via jacket 14 of reactor 5. The average rate value is based on 500 kg of pyrolysis gases to be extracted from the reactor in 2.5 hours. Simultaneous with the feeding of pyrolysis gases to jacket 14, the feeding of combustion products to jacket 14 is stopped. For this, valve 27 is shut off and valve 28 is opened. Passing via jacket 14 of reactor 5, the pyrolysis gases convey heat to the reactor walls, which is next conveyed to the rubber waste in the reactor, while the gases are cooled. Feeding pyrolysis gases heated to a high temperature directly to the condenser may result in the condenser's overheating and failure. On the other hand, extraction of pyrolysis gases to the condenser via the reactor jacket enables effective use of the pyrolysis gases' thermal energy and reduction of the energy consumption of the soot production process. Valve 15 is shut off, and cooled pyrolysis gases are fed at the average rate of 200 kg/h to condenser 26, where they are cooled down to a temperature below 100° C. by heat exchange with cooling water pumped through the condenser jacket. As a result of the cooling, a liquid hydrocarbon fraction is released from the pyrolysis gases by condensation, which is drained to tank 30 via valve 29.

Assume that in our case 180 kg/h of pyrolysis gases is condensed, and 20 kg/h are non-condensable gases (based on experimental data and literary references) supplied to burners 31 and 32 of cyclone reactor 33 and burnt. When gases are burnt in burners 31 and 32, a vortex of combustion products at a high (1200° C. and higher) temperature is generated in the cyclone reactor, which is needed to obtain soot from liquid fraction. It is in turbulent vortex flows that soot generation is the most intense.

The average heating value of non-condensable pyrolysis gases is 30,000 kJ/kg, therefore 200 kg/h of air is fed to burners 31 and 32 with ventilator 34 and valve 35 (10 kg of air per 1 kg of gases is needed for complete combustion) to burn the gaseous products completely, producing 220 kg/h of combustion products as a result.

Some of the pyrolysis gases are returned from heat exchanger 13 via valve 24 to reactor 5 and passed through the waste layer in container 2. This is needed to supply heat to the waste and maintain the process of their thermal decomposition.

The completion of the rubber waste thermal decomposition process is monitored by the decrease of the gaseous product output. The pressure in the reactor begins to drop to the atmospheric value, and the quantity of pyrolysis gases extracted from heat exchanger 13 to condenser 26 is reduced to zero, which is also monitored by the quantity of liquid hydrocarbon fraction extracted from condenser 26 to tank 30, which virtually does not flow out of the condenser upon completion of the pyrolysis process.

Upon completion of the process of rubber waste thermal decomposition, fuel burning in burner 10 is stopped. Water from tank 38 in the amount of 40 kg is atomized into reactor 5 via nozzles 36 with pump 37, thus cooling container 2 with solid products down to a temperature below 100° C., which is monitored by readings of temperature sensor 19. This quantity of water is sufficient to cool the container (weight: 250 kg) and solid products in the container (weight: 500 kg) down to the temperature of 100° C. The steam resulting from evaporation of water atomized in reactor 5 is extracted to condenser 26 and condensed, and the obtained condensate is drained to tank 38 via valve 39. This water is then reused for atomizing into reactor 5 in a next waste thermal decomposition cycle in order to reduce the water consumption in the process and to prevent discharge of dirty water to the environment.

After cooling, the container with solid products of waste pyrolysis is taken out of reactor 5. For this, gate 6 is opened, and container 2 is driven out of reactor 5 on tails 4 with the aid of device 3. The container is dumped, and solid products in the amount of 500 kg are emptied under their own weight from container 2 to the discharge system 40 (bin with a screw). From discharge system 40, the solid products are fed to roller shredder 41 and shredded. After that, the solid products are fed to magnetic separator 42, with the aid of which metal in the amount of 50 kg is extracted from the solid products and fed to tank 43, and the solid products themselves in the amount of 450 kg are fed from magnetic separator to microgrinder 44, where these products are ground to a particle size of 0.1-0.5 mm, after which the ground products are fed to receiver 45.

Shredded worn tires are fed from bin 1 to container 2 in the amount of 1000 kg. When filled, container 2 is moved to reactor 5 on rails 4 with the aid of device 3, and gate 6 is closed. The waste decomposition process is repeated. Liquid fraction is fed from liquid hydrocarbon fraction tank 30 with pump 46 at the rate of 180 kg/h (monitored by readings of flowmeter 47) to nozzle 48, and atomized Simultaneously, solid products are fed from receiver 45 to disengager 49 at the rate of 180 kg/h, and a part of ashes in the amount of 10 kg/h is separated to be fed to receiver 50, and the solid products are fed at the rate of 170 kg/h with the aid of blower 51 via weight feeder 52 and vortex burner 53 to combustion chamber 54 of cyclone reactor 33. The generated vortex of ground solid products is mixed with the jet of atomized liquid hydrocarbon fraction; as a result, the liquid fraction is sedimented on the solid particles. Some of this fraction is soaked up by the particles' pores (the particles of solid products have a porous structure formed after the volatile products' release in the waste pyrolysis), and the rest forms a liquid film on the solid particles' surface. This mixture at the rate of 180 kg/h+170 kg/h=350 kg/h enters the jet of combustion products formed as a result of gas combustion in burners 31 and 32, and is heated up. The liquid film evaporates, and the produced gases begin to burn. Therefore, the particles' temperature rises; as a result, the soaked liquid fraction is removed from the particles as vapors, and residual volatile products are released. Besides, as a result of occurring thermal stresses, in aggregations of soot and ash particles (soot and ash particles have different thermal expansion coefficients) the ash particles and soot particles are separated (cracked), i.e. the aggregations are destroyed.

The air required for combustion of liquid fraction vapors comes from blower 51 with a solid phase flow. The air received from blower 51 is insufficient for complete combustion of the entire liquid fraction.

Assume that in our case 80 kg/h of liquid fraction is burnt producing 960 kg/h of combustion products, and 100 kg/h is thermally decomposed producing 60 kg/h of soot and 40 kg/h of flammable gases with a specific heat of 35,000 kJ/kg. From the solid residue, volatile hydrocarbons are removed in the amount of 20 kg/h, which are partially burnt (5 kg/h) and partially decomposed yielding 5 kg/h of soot and 10 kg/h of flammable gases with a specific heat of 35,000 kJ/kg.

As a result, a mixture of gases is generated in the cyclone reactor in the amount of 960 kg/h+220 kg/h+40 kg/h+10 kg/h=1230 kg/h, and of solid particles in the amount of 60 kg/h+5 kg/h+150 kg/h=215 kg/h (soot, ashes), which travels in the cyclone reactor and enters refrigerator 55.

In this balance, 960 kg/h are products of combustion of 80 kg/h of the liquid fraction, 220 kg/h are products of combustion of non-condensable gases in burners 31 and 32, 40 kg/h=gaseous products of the liquid fraction decomposition, and 10 kg/h=gaseous products of volatiles' decomposition.

The solid particles are 60 kg/h soot produced from the liquid fraction, 5 kg/h is soot generated from volatile products, and 150 kg/h is the residue of solid products (mixture of soot and ashes) after the release of volatile hydrocarbons entered into the cyclone reactor with the vortex burner at the rate of 170 kg/h. In refrigerator 55, the mixture containing gases and solid particles (amount 1230 kg/h+215 kg/h=1445 kg/h) is cooled by atomizing 400 kg/h of water, which is fed from tank 56 to nozzle 58 with pump 57. The mixture cooled to 500° C. is fed to cyclone 59 where solid particles (soot, ashes, products of reactor lining breakage etc.) are released from the mixture and cooled down. In cyclone 59, 90% of solid particles, i.e. 194 kg, are separated from the gas flow. The solid particles from cyclone 59 at the rate of 194 kg/h are fed to disengager 60. In disengager 60, large ash particles (over 0.1 mm in size) are separated at the rate of 2 kg/h and fed to receiver 61, and the main flow of particles from the disengager at the rate of 192 kg/h is fed to electrostatic separator 62 where soot in the amount of 186 kg/h and ashes in the amount of 6 kg/h are separated. The soot from separator 62 is pneumatically fed with the aid of blower 63 at the rate of 186 kg/h to receiver 64, and the ashes at the rate of 6 kg/h is discharged to receiver 65. The gases from cyclone 59 at the rate of 1230 kg/h+400 kg/h (steam)+21 kg/h (particles)=1651 kg/h are fed to fabric filter 66, where file soot and ash particles are separated in the amount of 21 kg/h, which were not sedimented from the gas flow in cyclone 59. These particles at the rate of 21 kg/h are fed into electrostatic separator 62 and divided into soot at 14 kg/h and ashes at 7 kg/h. The gases cleaned free of solid particles in the fabric filter contain flammable components, therefore these gases at the rate of 1630 kg/h are fed for burning to the heat exchanger's burner 10. This enables prevention of pollution (the gases contain CO, hydrogen, and aromatic hydrocarbons) of the atmosphere and efficient use of the energy of these gases, thus reducing the total energy costs of soot production. The specific heat of these gases is 1100 kJ/kg, and the combustion of 1630 kg/h of the gases releases energy of 1,793,000 kJ, and the thermal power will be 498 kW.

The thermal power of burner 10 when burning 50 kg/h of liquid fuel with the specific heat of 40,000 kJ/kg is 556 kW. Thus, by burning gases the supply of liquid fuel to burner 10 may be reduced from 50 kg/h to 5 kg/h, i.e. the energy consumption can be reduced by using the waste energy (flammable gas is obtained from the waste).

The total quantity of high-quality soot produced from 1000 kg of waste is (186 kg/h+14 kg/h)·2.5 h=500 kg.

In this case, the soot yield is 50% wt, i.e. much higher compared to the prototype (28-35%).

Example 2

Worn tires shredded to a particle size of 100 mm in the amount of 500 kg are fed from bin 1 to container 2. When filled, container 2 is moved with device 3 to pyrolysis reactor 5 on rails 4, and gate 6 is closed. Branch 7 for gas supply to container 2 is connected to branch 8 installed between the rails in reactor 5. Fuel is fed from fuel tank 9 at the rate of 30 kg/h to burner 10 and burnt, and the combustion products at the rate of 360 kg/h are pumped through tubes 12 of shell-and-tube heat exchanger 13 with smoke exhauster 11; next, the combustion products are pumped through jacket 14 of reactor 5 and via valve 15 removed to flue gas duct 16. Passing via the tubes of heat exchanger 13, the combustion products heat the tubes in the heat exchanger. Heat from heat exchanger tubes is conveyed to disperse bed 17, whose particle diameter is 10 cm, and the bed itself is for example coarse gravel. The disperse bed is heated to a temperature of over 1100° C. The disperse bed heating temperature is monitored by readings of temperature sensor 18. Passing via jacket 14 of reactor 5, the combustion products heat the reactor walls. Heat from the walls of reactor 5 is conveyed by emission and convection to the walls of container 2; next, heat is transferred from the walls by thermal conduction to the shredded rubber waste, heating it. The amount of heat necessary for the full thermal decomposition of 500 kg of waste is 680,000 kJ.

The rubber waste heating temperature is monitored by readings of temperature sensor 19. Initially after container 2 enters reactor 5, the gaseous medium contains mainly air. With the aid of pyrolysis gas extractor (ventilator) 20, the gaseous medium is pumped through the waste layer in container 2 and through disperse bed 17 of heat exchanger 13. Being filtered through disperse bed 17, the gaseous medium is heated, which is monitored by readings of temperature sensor 21, and next, via branch 8 of reactor 5 and branch 7 of container 2 is returned to the ground waste layer and heats the waste when passing through the layer. Thus the thermal energy required for thermal decomposition of the waste is supplied via the walls of container 2 and is fed directly to the waste layer with the aid of the heated gaseous medium.

The combustion of 30 kg/h of fuel in burner 10 release an amount of heat equal to 30 kg/h. 40,000 kJ/kg=1,200,000 kJ/h. Assume the efficiency of heat exchanger 13 is in this case 45%, i.e. the gaseous medium flowing through the disperse bed in the shell side of heat exchanger 13 receives the following amount of heat: 1,200,000 kJ/h·0.45=540,000 kJ/h. Some of this heat is spent for heating the rubber waste both due to direct heat transfer when the heated gaseous medium flows through the waste layer in container 2, and due to heat exchange from the heated walls of reactor 5. Assume that in our case 63% of this heat is spent for heating and thermal decomposition of the waste, i.e. 340,000 kJ/h.

In this case, the time required for full thermal decomposition of 500 kg of waste is t=(680,000 kJ)/(340 000 kJ/h)=2 h, since it is in this time that the quantity of energy needed for thermal decomposition of 500 kg of waste will be supplied. During this time, the following quantity of fuel must be burnt in burner 10: 30 kg/h·2 h=60 kg.

When rubber waste is heated up to a certain temperature (depending on the type of waste), for instance to 300° C. in our case, the process of thermal decomposition of rubber will start, generating pyrolysis gases and solid products.

Assume that in our case the rubber waste thermal decomposition releases 40% wt of pyrolysis gases and generates 60% wt of solid products containing 10% wt of metal cord, 10% wt of ashes and 10% wt of volatiles. Thus, in our case, decomposition of 500 kg of waste will yield 200 kg of pyrolysis gases and 300 kg of solid products containing 30 kg of metal cord, 30 kg of ashes, 30 kg of volatile hydrocarbons, and 210 kg of soot that was used in the manufacturing of rubber and is already contained in the solid products of waste pyrolysis.

The pyrolysis gases enter the gaseous medium and in a mixture with the medium, circulate along the circuit "reactor 5—heat exchanger 13." As a result of release of pyrolysis gases, the pressure in reactor 5 rises, which is monitored by readings of pressure sensor 22. To prevent a significant pressure rise and collapse of reactor 5 some of the pyrolysis gases heated to a temperature of over 1100° C. (it is at such temperatures that pyrolysis gases contain negligible quantities of resins and asphaltenes reducing the quality performances of liquid raw material for soot production) are extracted with valves 23, 24 and blower 25 from heat exchanger 13 at the average rate of 100 kg/h and fed to condenser 26 via jacket 14 of reactor 5. Simultaneous with the feeding of pyrolysis gases to jacket 14, the feeding of the combustion products to jacket 14 is stopped. For this, valve 27 is shut off and valve 28 is opened. Passing via jacket 14 of reactor 5, the pyrolysis gases transfer heat to the reactor walls, which is further conveyed to the rubber waste in the reactor, and the gases are cooled. Feeding the pyrolysis gases heated to a high temperature directly to the condenser may lead to the condenser's overheating and failure. At the same time, the extraction of pyrolysis gases to the condenser via the reactor jacket enables effective use of the pyrolysis gases' thermal energy and reduction of the energy consumption for soot production. Next, the cooled pyrolysis gases at the average rate of 100 kg/h are fed to condenser 26, and by heat exchange with cooling water pumped through the condenser jacket are cooled to a temperature below 100° C. As a result of the cooling, a liquid hydrocarbon fraction is released from the pyrolysis gases by condensation, which is drained to tank 30 via valve 29.

Assume in our case that 85 kg/h of pyrolysis gases is condensed, and 15 kg/h are non-condensable gases fed to burners 31 and 32 of cyclone reactor 33 and burnt. When burning the gases in burners 31 and 32 in cyclone reactor 33, a vortex of combustion products is formed with a high (1200° C. and higher) temperature, needed to obtain soot from liquid fraction.

The average heating value of non-condensable pyrolysis gases is 30 000 kJ/kg, therefore 150 kg/h of air is fed to burners 31 and 32 with ventilator 34 and valve 35 (10 kg of air per 1 kg of gases is needed for complete combustion) to burn the gaseous products completely, producing 165 kg/h of combustion products as a result.

Some of the pyrolysis gases are returned from heat exchanger 13 to reactor 5 via valve 24 and passed through the waste layer in container 2. The pyrolysis gases are cooled, and the rubber waste is heated, thus providing access to waste heat necessary for the thermal decomposition process.

The completion of the rubber waste thermal decomposition process is monitored by the decrease of the gaseous product output. The pressure in the reactor begins to drop to the atmospheric value, and the quantity of pyrolysis gases extracted from heat exchanger 13 to condenser 26 is reduced to zero, which is also monitored by the quantity of liquid hydrocarbon fraction extracted from condenser 26 to tank 30, which virtually does not flow out of the condenser upon completion of the pyrolysis process.

Upon completion of the rubber waste thermal decomposition process the fuel burning in burner 10 is stopped. Water from tank 38 in the amount of 30 kg is atomized into pyrolysis reactor 5 via nozzles 36 with pump 37, thus cooling container 2 with solid products to a temperature below 100° C., thus cooling container 2 with carbon residue to a temperature below 100° C., which is monitored by readings of temperature sensor 19. The steam resulting from evaporation of water atomized in reactor 5 is extracted to condenser 26 and condensed, and the obtained condensate is drained to tank 38 via valve 39.

This water is then reused for atomizing in reactor 5 in a next waste thermal decomposition cycle in order to reduce the water consumption in the process and to prevent discharge of dirty water into the environment.

After cooling, the container with solid products of waste pyrolysis is removed from reactor 5. For this, gate 6 is opened and container 2 is taken out of reactor 5 with device 3 on rails 4. The container is dumped, and solid products in the amount of 300 kg are emptied under their own weight from container 2 to the discharge system 40 (bin with a screw). From discharge system 40, the solid products are fed to roller shredder 41 and shredded. After this, the solid products are fed to magnetic separator 42, with the aid of which metal in the amount of 30 kg is extracted from solid products and fed to tank 43, and the solid products themselves in the amount of 270 kg are fed from the magnetic separator to microgrinder 44, where these products are ground to particle sizes of 0.1-0.5 mm, after which the ground products are fed to receiver 45.

Shredded worn tires in the amount of 500 kg are fed from bin 1 to container 2. When filled, container 2 is moved with device 3 to pyrolysis reactor 5 on rails 4, and gate 6 is closed. The waste decomposition process is repeated.

From liquid hydrocarbon fraction tank 30, liquid fraction is fed with pump 46 (monitored by readings of flowmeter 47) to nozzle 48 at the rate of 85 kg/h and atomized Simultaneously, solid products are fed from receiver 45 to disengager 49 at the rate of 135 kg/h, and some ashes in the amount of 5 kg/h are separated, to be fed to receiver 50, while the solid products are fed with blower 51 via weight feeder 52 and vortex burner 53 to combustion chamber 54 of cyclone reactor 33 at the rate of 130 kg/h. The generated vortex of ground solid products is mixed with the jet of atomized liquid hydrocarbon fraction; as a result, the liquid fraction is sedimented on the solid particles. Some of this fraction is soaked up by the particles' pores (the particles of solid products have a porous structure formed after the volatile products' release in the waste pyrolysis), and the rest forms a liquid film on the solid particles' surface. This mixture enters the combustion products jet formed as a result of gas combustion in burners 31 and 32, and is heated up. The liquid film evaporates, and the produced gases begin to burn. The particles' temperature rises; as a result, the absorbed liquid fraction is removed from the particles as vapors, and the residual volatile products are released. Besides, as a result of occurring thermal stresses, in aggregations of soot and ash particles (soot and ash particles have different thermal expansion coefficients) the ash particles and soot particles are separated (cracked), i.e. the aggregations are destroyed.

Assume that in our case 20 kg/h of liquid fraction is burnt producing 240 kg/h of combustion products (the combustion of 1 kg of liquid fraction yields 12 kg of combustion products), while 65 kg/h is thermally decomposed producing 26 kg/h of soot and 39 kg/h of flammable gases with a specific heat of 35,000 kJ/kg. Removed from the solid residue are volatile products (hydrocarbons) in the amount of 15 kg/h, which are partially burnt (3 kg/h) and partially decomposed yielding 4 kg/h of soot and 8 kg/h of flammable gases with a specific heat of 23 000 kJ/kg.

As a result, the cyclone reactor generates a mixture of gases in the amount of 240 kg/h+165 kg/h+39 kg/h+8 kg/h+33 kg/h=485 kg/h and solid particles in the amount of 26 kg/h+4 kg/h+115 kg/h=145 kg/h (soot, ashes), which travels in the cyclone reactor and enters refrigerator 55.

In this balance, 240 kg/h are products of combustion of 20 kg/h of liquid fraction, 165 kg/h are products of combustion of non-condensable gases in burners 31 and 32, 39 kg/h=gaseous products of liquid fraction decomposition, 8 kg/h=gaseous products of volatiles decomposition, and 33 kg/h are volatiles' combustion products.

The solid particles are 26 kg/h of soot generated from liquid fraction, 4 kg/h is soot formed from volatile products, and 115 kg/h is the residue of solid products (mixture of soot and ashes) after the release of volatile hydrocarbons injected into the cyclone reactor with the vortex burner in the amount of 130 kg/h.

In refrigerator 55, the mixture containing gases and solid particles (its amount being 485 kg/h+145 kg/h=630 kg/h) is cooled by atomizing 350 kg/h of water, which is fed from tank 56 to nozzle 58 with pump 57. The mixture cooled to 400° C. is fed to cyclone 59 where solid particles (soot, ashes, products of reactor lining breakage etc.) are released from the mixture and cooled down. 95% of solid particles is released, i.e. 138 kg/h. The solid particles from cyclone 59 are fed to disengager 60. In disengager 60, large particles (over 0.1 mm in size) are separated in the amount of 3 kg/h and fed to receiver 61, and the main flow of particles from the disengager at the rate of 135 kg/h is fed to electrostatic separator 62, where soot in the amount of 129 kg/h and ashes in the amount of 6 kg/h are released. The soot from separator 62 is pneumatically fed with the aid of blower 63 at the rate of 129 kg/h to receiver 64, and ashes at the rate of 6 kg/h are discharged to receiver 65. The gases from cyclone 59 at the rate of 485 kg/h+350 kg/h (steam)+7 kg/h (particles)=842 kg/h are fed to fabric filter 66 where fine soot and ash particles in the amount of 7 kg/h are separated that were not sedimented from the gas flow in cyclone 59. These particles at the rate of 7 kg/h are fed to electrostatic separator 62 and divided into soot, 6 kg/h, and ashes, 1 kg/h. The gases cleaned free of solid particles in the fabric filter contain flammable components, therefore these gases are fed for burning to the burner of heat exchanger 10 at the rate of 835 kg/h. This prevents pollution (the gases contain CO, hydrogen, and aromatic hydrocarbons) of the atmosphere and enables effective use of the gases' energy, resulting in lower total energy consumption for the soot production process The specific heat of these gases is 1290 kJ/kg, and the energy released in the combustion of 835 kg/h of these gases is 1077150 kJ, the thermal output being 300 kW.

The thermal power of burner 10 when burning 30 kg/h of liquid fuel with the specific heat of 40,000 kJ/kg is 333 kW. Thus, by burning the gases, the supply of liquid fuel to burner 10 may be reduced from 30 kg/h to 3 kg/h.

The total quantity of high-quality soot obtained is (129 kg/h+6 kg/h). 2 h=270 kg/h. 500 kg of waste was used to make such quantity of soot.

In this case, the soot yield is 54% wt, i.e. much higher compared to the prototype (28-35%).

INDUSTRIAL APPLICABILITY

The claimed device for production of soot from rubber waste differs from prior devices in the energy consumption, emissions to the environment, and product quality, confirming the compliance of the claimed invention with the "industrial applicability" criterion.

What is claimed is:

1. A device for production of soot from rubber wastes, comprising:
    a pyrolysis reactor fluidly connected to a pyrolysis gas extractor, a pyrolysis gas condenser and a flue gas extractor;
    a solid product discharging system:
    a solid pyrolysis product receiver coupled to the solid product discharging system; and
    a thermal unit including a shell-and-tube heat exchanger having a burner coupled to a tubes portion of the heat exchanger,
    wherein a shell portion of the heat exchanger is filled with disperse material composed of particles having dimensions in a range of 3-10 cm.

2. The device of claim 1, wherein the solid product pyrolysis product receiver comprises a shredder, a magnetic separator, a micro-grinder, and a disengaging unit coupled to a cyclone reactor provided with a vortex burner having an axially installed nozzle.

3. The device of claim 2, wherein the cyclone reactor is coupled to an electrostatic separator and a fabric filter having a gas outlet coupled to the burner.

4. The device of claim 2, further comprising a cyclone, a disengaging unit and an electrostatic separator which are in series connected to the cyclone reactor.

5. The device of claim 1, wherein the pyrolysis gas extractor comprises (i) an inlet connected to the pyrolysis reactor and (ii) an outlet connected to the shell portion of the heat exchanger.

6. The device of claim 1, wherein the pyrolysis gas condenser comprises an inlet coupled to a jacket of the pyrolysis reactor, said jacket coupled to tubes providing cooled pyrolysis gases to the condenser.

* * * * *